(12) United States Patent
Tanaka et al.

(10) Patent No.: US 7,941,363 B2
(45) Date of Patent: May 10, 2011

(54) SYSTEM, METHOD AND COMPUTER PROGRAM PRODUCT FOR MANAGING CREDIT DECISIONS

(75) Inventors: Satoshi Tanaka, Tokyo-to (JP); Yasutaka Maeda, Yokohama (JP); Shinichi Takaku, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 2720 days.

(21) Appl. No.: 10/639,663

(22) Filed: Aug. 12, 2003

(65) Prior Publication Data
US 2004/0107161 A1    Jun. 3, 2004

(30) Foreign Application Priority Data
Aug. 13, 2002    (JP) ................................ 2002-236100

(51) Int. Cl.
*G06Q 40/00*    (2006.01)
(52) U.S. Cl. ........................................................ 705/38
(58) Field of Classification Search ............... 705/35–40
See application file for complete search history.

(56) References Cited

U.S. PATENT DOCUMENTS 5,774,883 A * 6/1998 Andersen et al. ............... 705/38
6,324,524 B1 * 11/2001 Lent et al. ....................... 705/38

FOREIGN PATENT DOCUMENTS
WO    WO 99/48036    * 9/1999

* cited by examiner

*Primary Examiner* — Thomas M Hammond, III
(74) *Attorney, Agent, or Firm* — Christopher & Weisberg, P.A.

(57) ABSTRACT

A system, computer program product and method for deciding whether to make a loan to an applicant and/or terms of the loan. A first program function determines a credit risk of the applicant. A second program function computes a default probability of the applicant over time based on the credit risk. The second program function determines a surviving probability of an applicant based on the applicant's credit risk. The second program function determines the default probability for each month of the term of the loan based in part on the surviving probability. A third program function computes a sum of the expected profit during each month of a term of the loan based in part on the default probability.

14 Claims, 8 Drawing Sheets

SYSTEM, METHOD AND COMPUTER PROGRAM PRODUCT FOR MANAGING CREDIT DECISIONS

The present invention relates generally to a computer system, program and method for determining whether to make a loan/extend credit to an applicant and/or loan/credit terms.

Processes are currently known for determining credit risk of an applicant and the terms of the loan. These processes are generally based on the financial resources and other factors existing at the time that the credit application is considered. However, many loans extend over several or many years, and the financial situation of the applicant can change during those years.

Accordingly, an object of the present invention to create a program tool and automated process which predicts a credit risk during future, relevant years.

Another object of the present invention is to create a program tool and automated process which estimates a future profit from the proposed loan, and uses this estimate in combination with the predicted credit risk to determine whether to extend credit/make the loan.

SUMMARY OF THE INVENTION

The invention resides in a system, computer program product and method for deciding whether to make a loan to an applicant and/or terms of the loan. A first program function determines a credit risk of the applicant. A second program function computes a default probability of the applicant over time based on the credit risk. A third program function computes a sum of the expected profit from the loan based in part on the default probability.

According to one feature of the present invention, the second program function determines a probability that the applicant will make full payment throughout the life of the loan, based on the credit risk of the applicant. The second program function determines the default probability for each month of the term of the loan based in part on the full payment probability. The third program function determines the expected profit during each month of the term of the loan based on the default probability.

More generally speaking, the present invention decides whether to extent credit based on the probability that the applicant (typically a person) will repay the loan as scheduled and the estimated profit. The credit risk is analyzed as a function of time based on the attributes and contract history of the applicant. The estimated profit expectancy is also compared to a minimum required profit for the lender. Attributes of the applicant are entered at a terminal and then transmitted to a server. A credit management program at the server determines the credit risk and expected profit, and then transmits the credit decision back to the terminal.

According to one embodiment of the present invention, the credit management program comprises:
(a) a risk analysis program function to execute a risk analysis based on a risk model;
(b) a term analysis program function for computing a default probability of the applicant over time based on the risk analysis;
(c) a future profit expectancy computation program function for computing the sum of the expected profit for the applicant based on the default probability; and
(d) a downward risk computation program function for computing a risk that the risk model is shifted downward in comparison with the expected profit.

In the illustrated embodiment, these functions operate as follows. The risk analysis program function constructs a new risk model for a new applicant and an updated risk model for an existing borrower. Also, the term analysis program function computes the default probability based in part on the term of the loan. The future profit expectancy computation program function computes the expected profit during the loan term for the applicant. Alternately, the future profit expectancy computation program function classifies the applicant into an initial status class, computes a probability that the applicant will transition from the initial status class into another status class based on the credit risk of the applicant, and determines a probability of the applicant's complete performance or default in payment.

According to specific features of the present invention, a probability that the application will continue with timely payment (without default or bankruptcy) is based on a "permission term" which is based on the applicant's credit risk. The permission term is based on (a) a credit risk (which is based on the risk analysis), (b) a default probability based on the risk of an applicant's failure to make payment for each contract month (which is based on the surviving probability), (c) a profit expectancy during a given term for the loan based on the default probability, and (d) a downward risk affect on the expected profit.

To construct the new risk model or the updated risk model, a logistic regression analysis is performed to determine a risk probability score by evaluating quantitative and qualitative variables provided for an applicant. The variables are information on the loan application. This logistic regression analysis is based on a tree analysis wherein the applicant is grouped into a class based on the credit risk. The result of the tree analysis is the risk probability score. The process of computing the default probability comprises computing the surviving probability based on a risk pattern changing with the passage of time and a risk level that is a constant, and computing a monthly default probability from the computed surviving probability. The expected profit is the loan interest minus expenses and a statistical loss based on the default probability. The expected profit is accumulated until the date that the applicant is expected to complete or default in payment. The computation of the expected profit considers the possibility of the applicant's complete performance in payment transitioning from one month to the next, and computes the expected profit from the computed status probability.

DETAILED DESCRIPTION OF THE PREFERRED EMBODIMENTS

Figure 1:
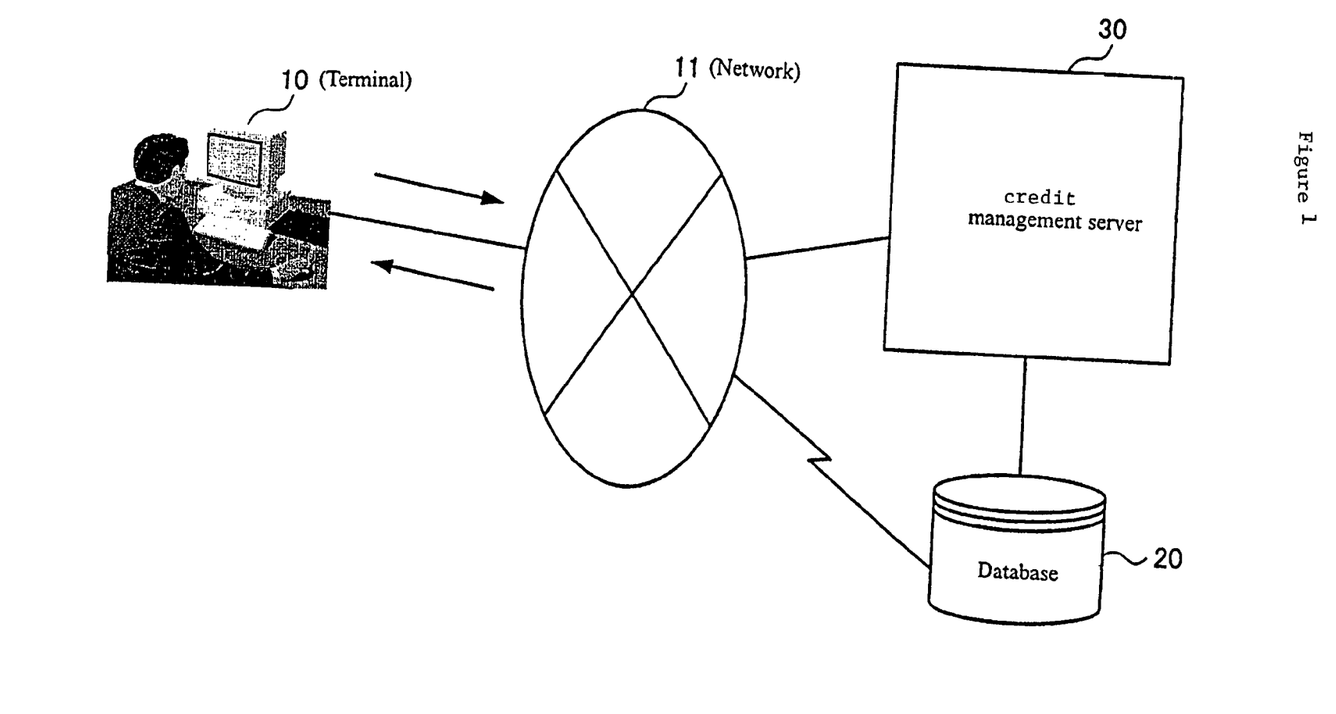
FIG. 1 is a block diagram of a credit management system according to an embodiment of the present invention.

FIG. 1 is a high level, block diagram showing a credit management system generally designated 8 according to one embodiment of the present invention. The credit management system 8 comprises a terminal 10 through which information on applications for loans/credit and loan/credit applicants are input. In this patent application the terms "loan" and "credit" are used interchangeably. This information is supplied to a credit management server 30 via a network 11, and stored in a database 20 (such as DASD). Credit management server 30 executes a credit management program 40 based on the information in database 20.

The credit management program 40 makes a final decision whether to extend the credit and the terms of the credit. As explained in more detail below, this decision is based on a score acquired from a risk model and user's knowledge acquired from a credit table. The know-how table systematically estimates the reliability of the applicant to make payment, and the chance that the applicant will commit fraud. The risk management program 40 supplies credit decisions to terminal 10 via network 11. The credit decisions include whether to extend the credit, and if so, the amount of the loan, scheduled repayment number, term of loan to maximize the return, etc. The credit decisions are based on the expected profit and credit risk for the term of the contract.

Figure 2:
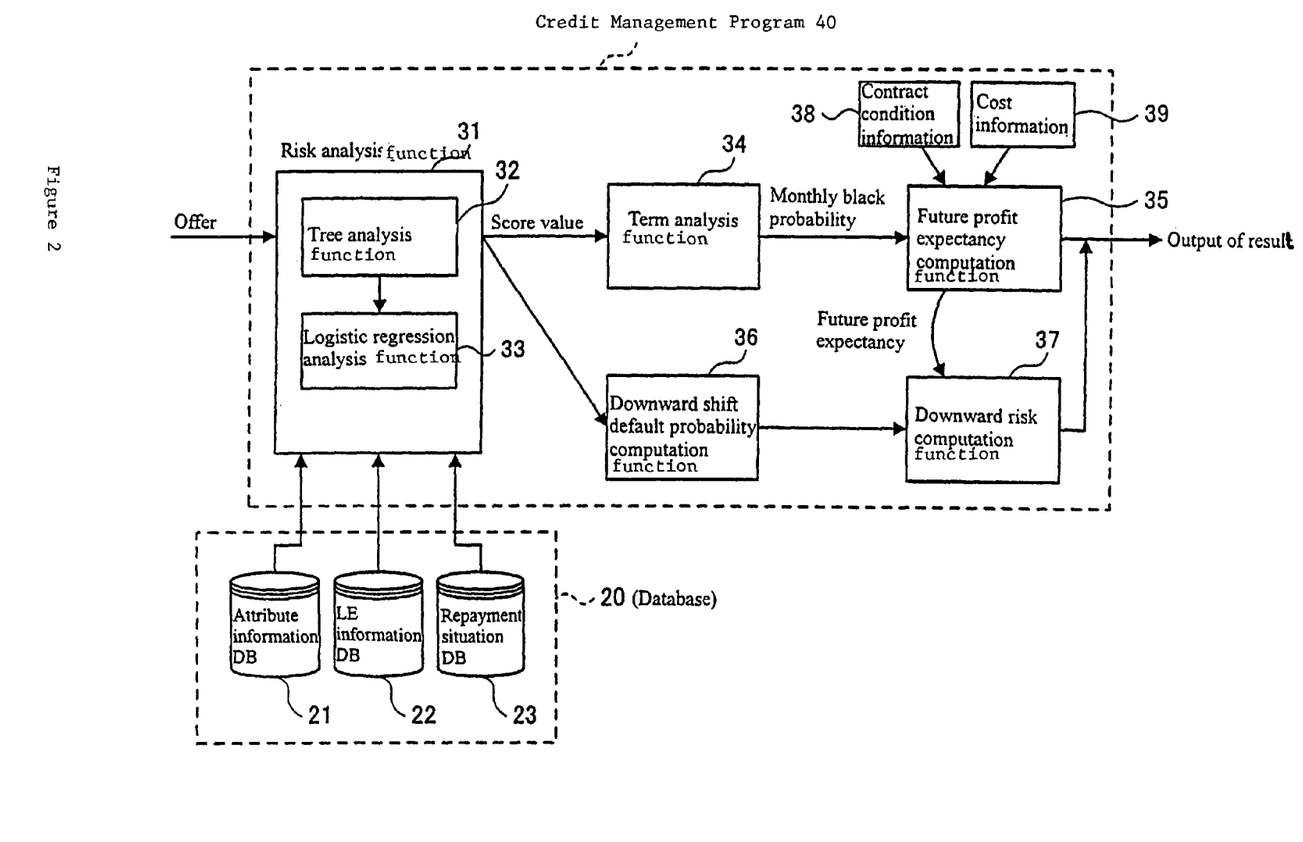
FIG. 2 is a block diagram showing a credit management server and a database of FIG. 1.

FIG. 2 is a block diagram showing the credit management server 30 including the credit management program 40 in more detail. The credit management program comprises:

- A credit risk analysis program function 31 for analyzing credit risks based on a credit risk model of an applicant desiring a loan, and generating a score representing the personal credit rating of the applicant.
- A term analysis program function 34 for computing a monthly default probability of the applicant over time, based on the score obtained from the risk analysis program function 31.
- A future profit expectancy computation program function 35 for computing an expected profit from the loan. This computation is based in part on the monthly default probability computed by the term analysis program function 34.
- A downward shift default probability computation program function 36 for computing a default probability when the risk model is shifted downward in view of the score obtained from the risk analysis program function 31.
- A downward risk computation program function 37 for computing a maximum loss amount (downward risk) when the risk model is shifted downward. This is based on the default probability computed by the downward shift default probability computation program function 36 and the amount of profit computed by the future profit expectancy computation program function 35. The future profit expectancy computation program function 35 computes the future profit expectancy based on contract condition information 38. The contract condition information 38 indicates the relationship between the term and the amount of the loan and cost information 39. Cost information 39 indicates various kinds of cost including advertising expenses and personal expenses. The contract condition information 38 and the indicated cost information 39 are stored as a table within the credit management server 30 or may be acquired from the database 20.

The risk analysis program function 31 includes a tree analysis program function 32 for creating a decision tree. The decision tree is created by automatically searching a combination of characteristic items that allows the intended results to be best separated. Risk analysis program function 31 also includes a logistic regression analysis program function 33 for performing logistic regression analysis with the result of tree analysis by the tree analysis program function 32 as one variable, and outputting the score representing the risk. The risk analysis program function 31 creates a risk model consisting of a new model for a new applicant and an updated model for an existing borrower. Function 31 outputs the score value of the risk corresponding to the applicant.

Database 20 comprises (a) an attribute information database 21 partitioned for each attribute and storing the foregoing regression factors, (b) an LE information database 22 for storing the number of other loans and balance of the loans for this applicant, i.e. the applicant's credit history, and (c) a repayment situation/history database 23 storing information regarding an existing repayment situation or default from the applicant. In the case where a new model for a new applicant is constructed in the risk analysis program function 31, the data stored in the attribute information database 21 and the LE information database 22 are read from the memory. In the case where an updated model is constructed in the risk analysis program function 31, the data stored in the repayment situation database 23 is read from the memory, because the history information (ex. contract information, foreign news information) is indispensable.

The attribute information database 21 stores the regression factor for each of the applicant's personal attributes such as occupational category, job service years, gender, category of business and capital purpose. Every regression factor is converted into a quantitative variable, and it is analyzed in the regression. ex. gender is converted into the code 0:male 1:female. The larger this regression factor, the greater the effect. The value of regression factor is employed in the logistic regression analysis performed by the logistic regression analysis program function 33. The attribute information database 21 stores, beside the regression factor, the value of Wald, i.e. statistical effect index of the variables, standard error and significance probability. This yields a common scale for the efficacy or effectiveness of the regression factor as the values corresponding to respective attributes.

Figure 3:
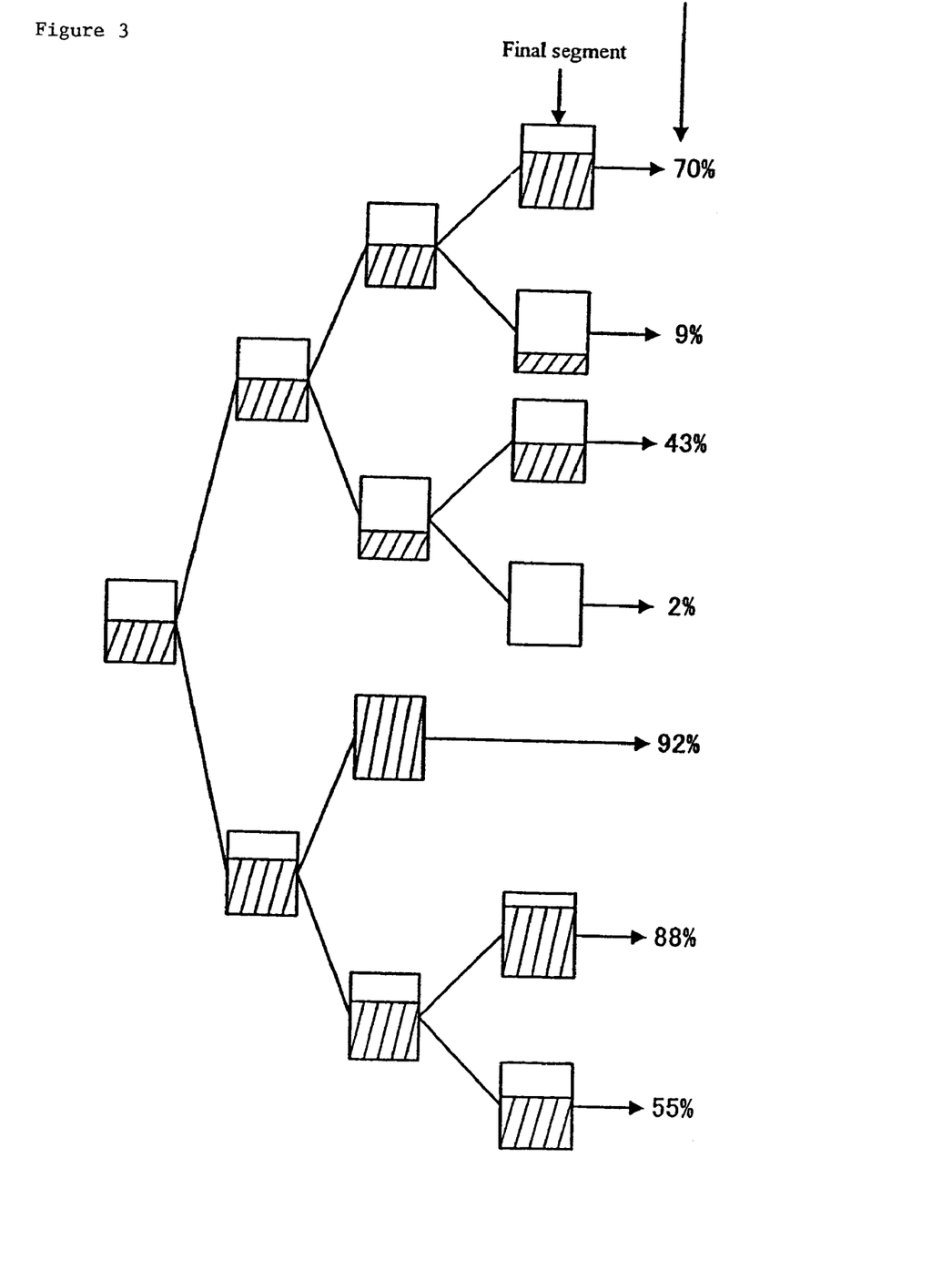
FIG. 3 figuratively illustrates a tree analysis program function of the server of FIG. 2

The following is a description of an analysis process performed by the risk analysis program function 31 with reference to FIG. 3. FIG. 3 is a diagram showing a process performed by the tree analysis program function 32.

In the "tree" analysis, the applicants are statistically grouped by their risk. The risk is expressed by a statistical effect index. The risk as used herein is a probability that the credit risk will worsen due to bad debt or arrearage over long term. In the analysis by the tree analysis program function 32, additional variables are produced based on the past data, for example composed of 10,000 pieces of the past data, and employed as the analytic items of interest. More specifically, the analytic samples are grouped by a QUEST method that is one of the analysis methods, depending on the chi-square value or "F" value. As a result of this tree analysis, the final segment is sectioned according to a combination of residence type (ex. whether the applicant owns a home or rents), number of years at the same residence, insurance type, and purpose of the loan, i.e. borrowing or spending. Then, a default probability for each group is decided. In FIG. 3, the default probability of a tree segment is indicated from 0 to 100% for each final segment. With finer branches, a combination condition of attributes can be increased. The tree analysis result made in this manner is stored in an external memory (not shown) such as hard disk drive provided for the risk management server 30.

The logistic regression analysis program function 33 performs the logistic regression analysis, with the result of the tree analysis by the tree analysis program function 32 as one input variable. Mainly, the quantitative variables for the applicant are evaluated, whereby the score value is derived for each applicant. In this logistic regression analysis, a new model is represented by the following expression:

$$1 \div (1 + EXP(W1(X1 + W2(X2 + \ldots + Wn(Xn)))$$

Where W1, W2, . . . , Wn are regression factors for the attributes stored in the attribute information database 21, and X1, X2, . . . , Xn are explanatory variables that take variable values as a result of analysis by the tree analysis program function 32.

Figure 4:
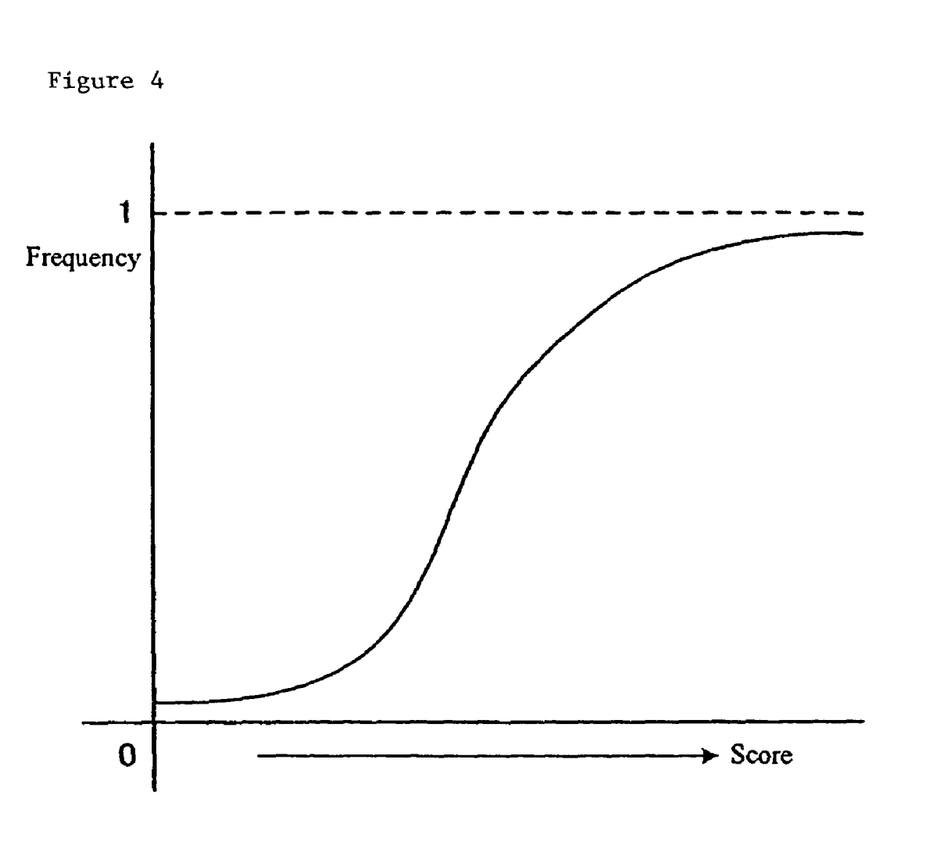
FIG. 4 is a graph showing an example of a logistic regression curve obtained from a logistic regression analysis program function of the server of FIG. 2.

FIG. 4 is a graph showing an example of a logistic regression curve obtained by the logistic regression analysis program function 33. The transverse axis indicates a score (score value) and the longitudinal axis indicates a frequency. The score is represented as follows:

$$\text{Score} = 1/\{1 + \exp(-(\text{regression factor } 1 \times \text{variable value } 1 + \ldots + \text{regression factor } n \times \text{variable value } n + \text{constant}))\}$$

In this manner, the logistic regression analysis program function 33 determines a default probability (probability of default in payment or risky condition, and probability of occurrence of an applicant's failure in payment) as one of the evaluation items, in which the risk of failure of the applicant is finely assessed and the evaluation result is stored in hard disk drive.

The following is a description of processing by the term analysis program function 34. The term analysis program function 34 computes a "surviving" probability of an applicant, i.e. the probability that the applicant will make timely payment. This is based on a "permission term" which is the statistical term during which the loan is considered safe, differing in accordance with a risk based on a risk analysis made by the risk analysis program function 31. This is also based on a default probability of an applicant's failure in payment for each contract month based on the surviving probability computed by the surviving probability computation. Herein, to realize a concept of term, a hybrid type term analysis (COX regression analysis) is performed to derive a monthly default probability (default probability for each month). Assuming that the surviving (contract permission term) differs in accordance with a risk in the hybrid type term analysis (COX regression analysis), the hazard rate (surviving probability) is computed. In computing the monthly default probability, the predicted default probability for each contract month is computed by approximating the actual default probability based on the hazard rate (surviving probability).

Figure 5:
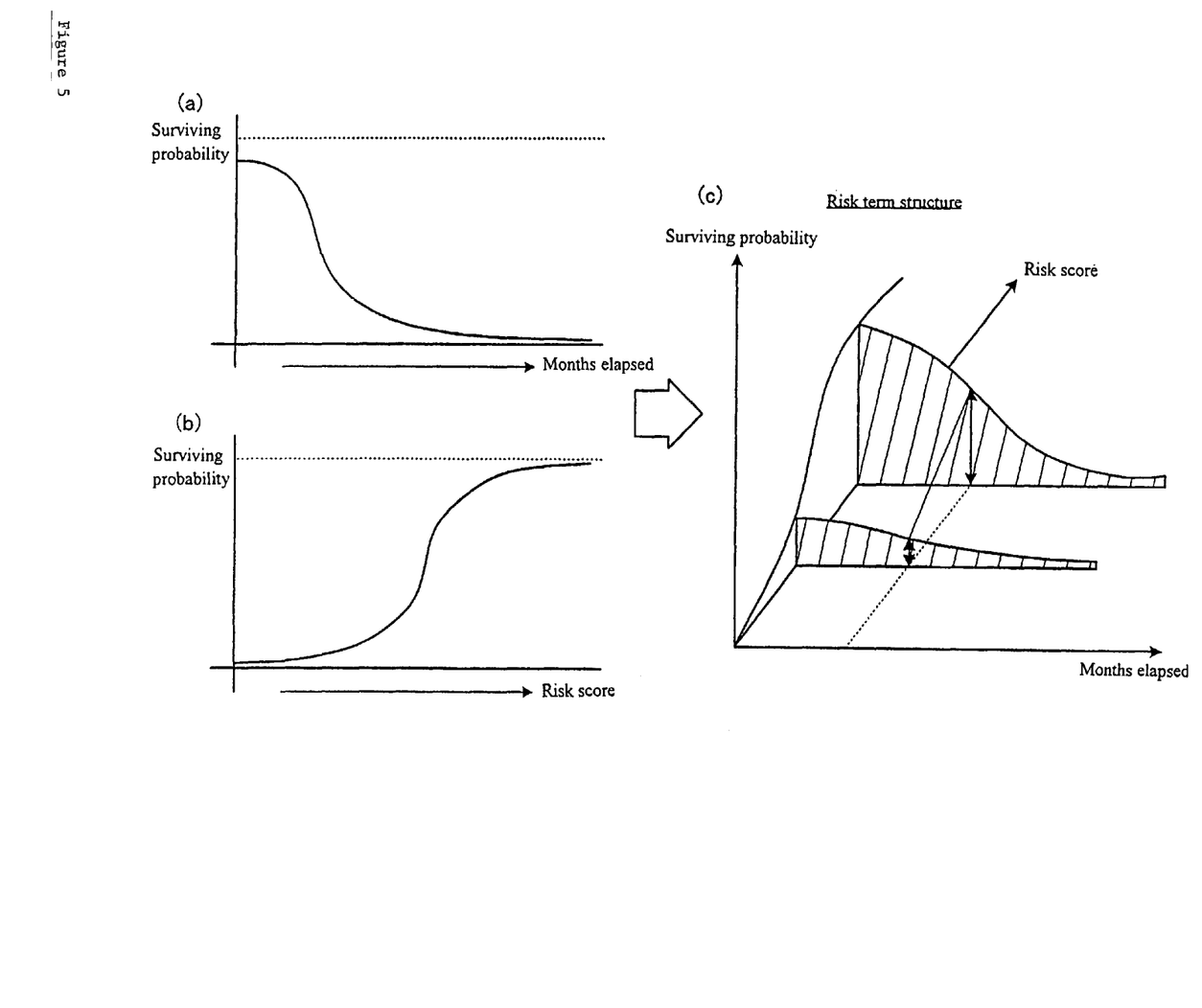
FIGS. 5A, 5B and 5C are graphs for explaining a proportional risk regression model used by the server of FIG. 2.

In this hybrid type term analysis (COX regression analysis), a proportional hazard regression model is employed. In this proportional hazard regression model, the risk is evaluated in respect of a time varying element and a time constant element. A hazard probability is defined as a probability that an applicant who is not in default (i.e. adequate payment state, for example, surviving state or safe state) until a certain time, then defaults to model a hazard function. This proportional hazard regression model is represented such as $$(\text{Surviving probability}) = (\text{risk pattern over time}) \times (\text{risk level})$$

Herein, the risk pattern over time has the hazard function as a baseline and the risk level is a risk pattern excluding the time varying element, into which the result indexes (score values) are incorporated from the tree analysis program function 32 of the risk analysis program function 31 and the logistic regression analysis program function 33.

FIGS. 5A, 5B and 5C are graphs for explaining a concept of the proportional hazard regression model. FIG. 5A shows an example of the risk pattern over time, indicating the surviving probability with respect to the passage of months. Also, FIG. 5B shows an example of the risk level, indicating the surviving probability with respect to the risk score. Also, FIG. 5C shows the surviving probability of multiplication of FIGS. 5A and 5B, in which the surviving probability is computed in view of the passage of months and the risk score as a risk term structure. In the risk term structure as shown in FIG. 5C, the larger the represented area, the lower the risk level. After the surviving probability W(t) for each month is computed in the above manner, the term analysis part 34 computes a monthly default probability (B probability: B(t)) that is a probability of failure in payment for the month. This default probability B(t) is represented such as $$B(t) = 1 - \{W(t) + W(t-1)\}$$

In this manner, the term analysis part 34 computes a predicted default probability for each contract month by approximating the actual default probability based on the surviving probability, in which the computed value is stored in memory. After the monthly default probability is computed in this manner, the actual sample data is expanded for each month, in which it is assumed that the residual cases are the observed values Wn(t) and Bn(t). At this time, the tentative default number bn2(t) is computed such as $$bn2(t) = Wn(t) \times B(t)$$

Figure 6:
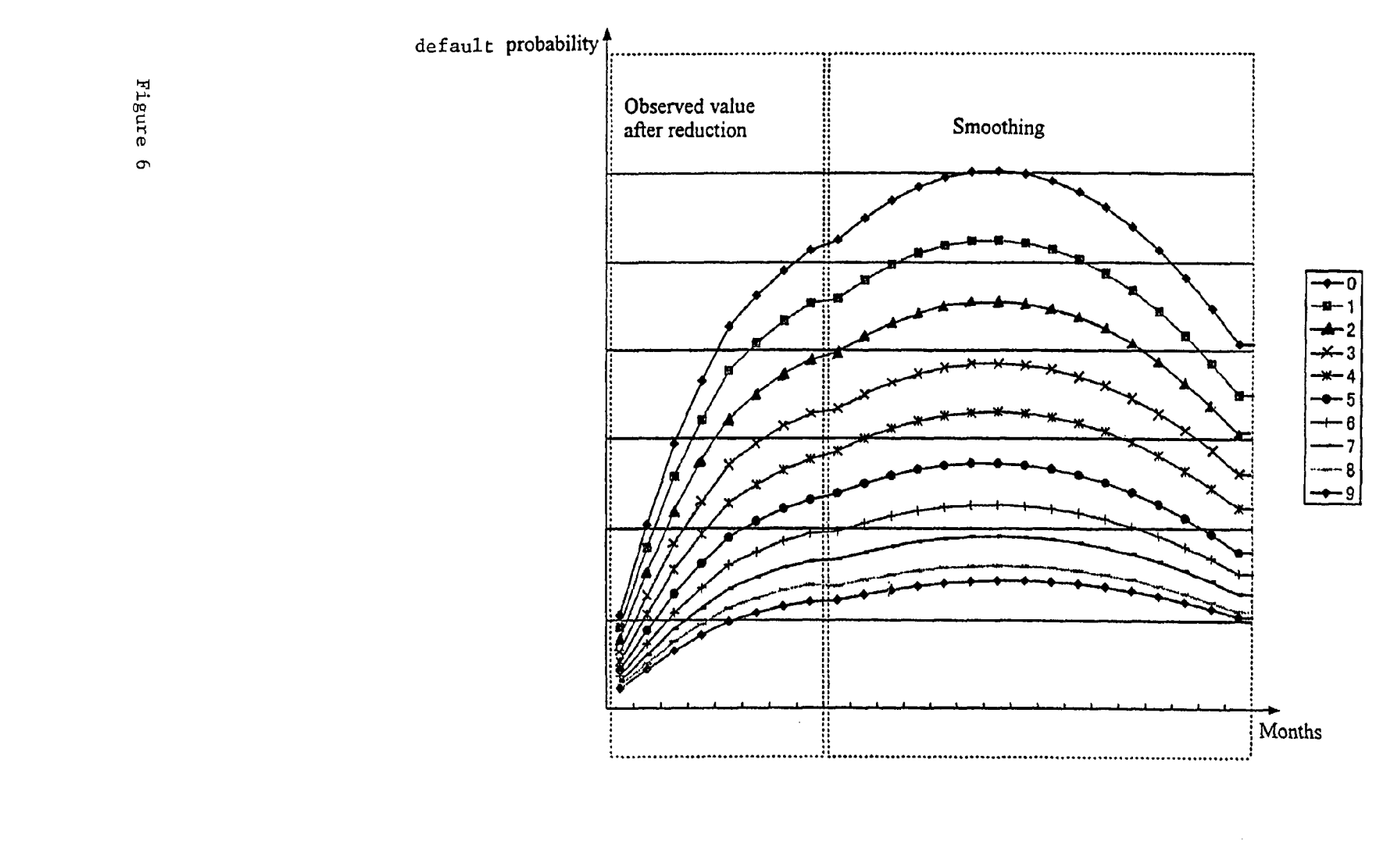
FIG. 6 is a graph showing a transition image at a monthly default probability used by the server of FIG. 2.

Moreover, in reducing the score approximate to the actual value from a model score, a supposed monthly default probability for reference is set up, and the score is reduced from the tentative default number and the supposed monthly default probability. Moreover, smoothing is made in a predetermined way in view of the shift, whereby a transition image of the default probability at each month is obtained as shown in FIG. 6. In FIG. 6, the transverse axis is time (month) and the longitudinal axis is monthly default probability (%), in which the transition image of the default probability is shown in ten divided categories for each risk score. Herein, the observed values after reduction are indicated from zeroth to eighth months, and the smoothed values are indicated from ninth to twenty fourth months, whereby the monthly default possibility is modeled to estimate the expected profit at every one score.

Next, the future profit expectancy computation part 35 computes the future profit expectancy during a given term for the applicant based on the monthly default probability computed in the term analysis part 34. The future profit expectancy model as used herein includes a "loaning time model" useful at the time of loaning and a "monthly model" useful for the monthly management. The future profit expectancy computation part 35 computes the sum of the expected profit (future profit expectancy) in loaning a desired amount from the computed "default probability for each month (monthly default probability)" of the applicant for a new model, based on the loaning conditions acquired from a basic database at the time of new loaning, that is, the attributes of the attribute information database 21 or the number of LE cases acquired from the LE information database 22. Also, in a reimbursement management, it computes the amount of the expected profit (future profit expectancy) from a previous month situation in accordance with a previous month status (normally a default) with loan balance, and the "default probability for each month (monthly default probability)" of applicant computed from the updated model, based on the previous month situation acquired from the information system database such as the repayment situation database 23. This updated model is created based on the direct attribute acquired from the attribute information database 21, the number of LE cases acquired from the LE information database 22, and the previous month repayment situation acquired from the repayment situation database 23.

Figure 7:
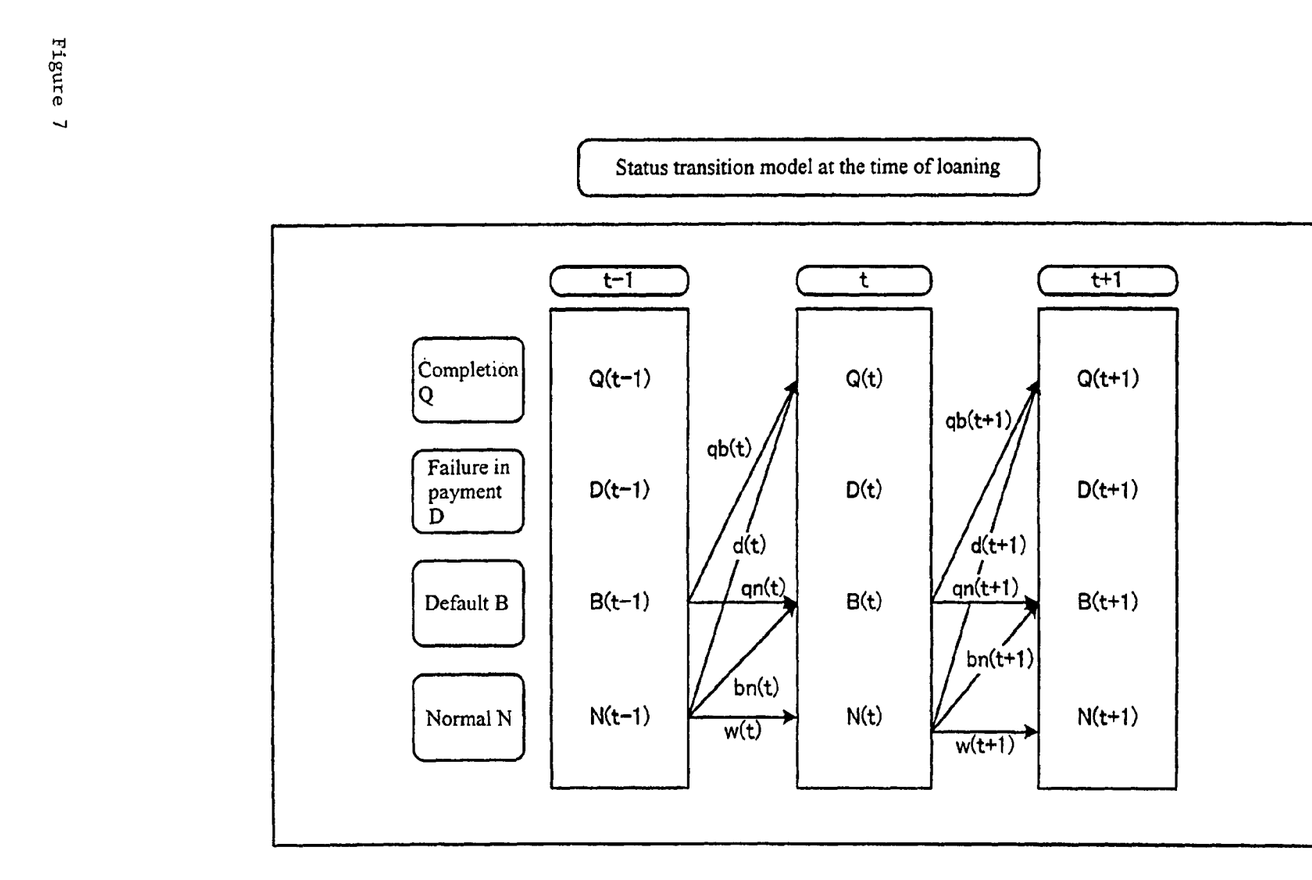
FIG. 7 illustrates a status transition model, at the time of extending credit, that is implemented by a future profit expectancy computation program function of the server of FIG. 2.

FIG. 7 is a diagram showing a status transition model at the time of loaning to be performed by the future profit expectancy computation program function 35. The applicants are classified into four statuses: normal N/failure B/default in payment D/completion Q. The probability of status transition is tentatively computed in accordance with the degree of risk for each applicant. In the transition model at the time of loaning as shown in FIG. 7, it is presupposed that (a) no transition from normal status directly to default in payment takes place, (b) transition from completion to default in payment takes place on average for each month in the contract terms, and (c) no transition from failure to normal will occur. Also, the transition probability is managed for up to sixty months, assuming that the probability of keeping normal is w(t), the probability of transition from normal to failure is bn(t), the probability of transition from failure to default in payment (=monthly default probability in the risk model) is d(t), the probability of transition from normal to completion is qn(t), and the probability of transition from failure to completion is qb(t). Where t indicates the term, in which t−1 is the previous month, t the present month, and t+1 the next month.

The future profit expectancy computation program function 35 tentatively computes a monthly situation of the applicant (probability of default and probability of completion) based on the contract condition information 38 and the cost information 39. Program function 35 also computes the interest, procurement cost, sales management cost, and loss at default in payment, and thereby the expected profit amount. The monthly expected profit V(t) is represented such as $$V(t)=R(t)-J(t)-E(t)-DF(t)$$

where the interest is R(t), the procurement cost is J(t), the sales management cost is E(t), and the loss at default in payment is DF(t). The procurement cost J(t) and the sales management cost E(t) are determined based on the past result of each cost and the probabilities of transition from one status to another status in the status transition model. And the loss at default in payment DF(t) are decided based on the default probability B(t) computed in the term analysis part 34.

The future profit expectancy is obtained by adding (accumulating) the monthly expected profit V(t) computed by subtracting from the loan interest R(t) the procurement cost J(t), the sales management cost E(t), and the loss at default in payment DF(t) based on the default probability B(t) over a term until applicant's completion or default in payment, and represented such as $$PV = \sum_{t=m}^{n} (t) * (1 + K/12)^{-(t-m+1)}$$

where K is the present discount rate. In this manner, the future profit expectancy computation program function 35 tentatively computes a monthly state for each applicant, and computes the future profit expectancy. A result of future profit expectancy computed in the above manner is output as an credit decision via the network 11 to the terminal 10 by taking into consideration a degree of risk with a downward risk.

Figure 8:
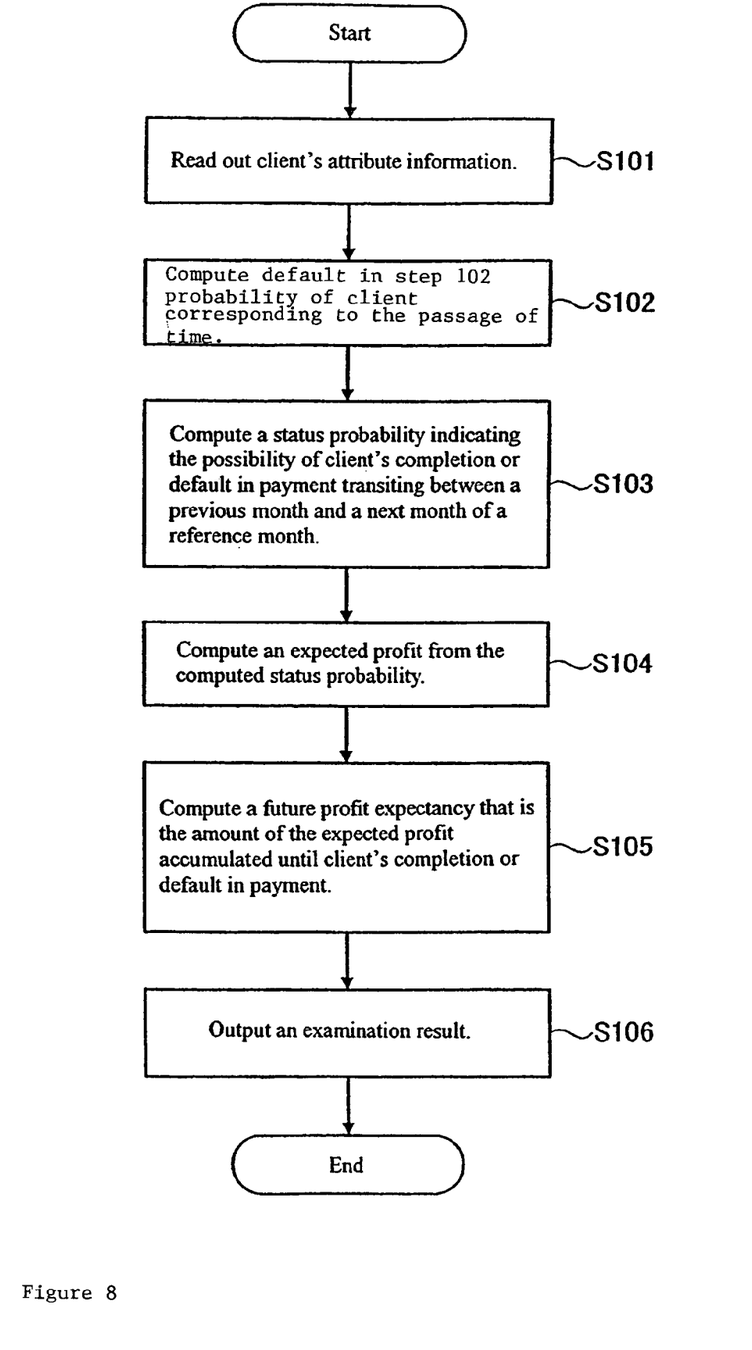
FIG. 8 is a flowchart illustrating a future profit expectancy computing process that is performed by the server of FIG. 2.

FIG. 8 is a flowchart illustrating a future profit expectancy computing process that is performed in the risk management server 30. First, the risk analysis program function 31 reads the attribute information of the applicant from the attribute information database 21 of the database 20 (step 101). The term analysis program function 34 computes the default probability that is the probability of occurrence of an applicant's failure in payment corresponding to the passage of time based on the obtained attribute information of the applicant (step 102). Then, the future profit expectancy computation program function 35 computes the expected profit which is the interest minus expenses and a loss, based on the computed default probability. In computing this expected profit, a status probability indicating the possibility of completion or default in payment that transits from one month to the next month of a reference month is determined (step 103). The expected profit is computed from the computed status probability (step 104). Thereafter, the future profit expectancy computation program function 35 computes the future expected profit accumulated over a term until applicant's completion or default in payment (step 105). The computed future expected profit is reflected to the credit decision, and output to the terminal 10 (step 106).

The monthly model has the same basic concept as the loaning time model, except that the direct state of the applicant is divided into nine statuses: default in payment, completion, freezing, unsettled, reconciliation, long term arrearage, middle term arrearage, short term arrearage, and normal. These states are reflected in the interest computation. Therefore, a "normal model" for the normal applicant and an "unsettled model" for the defaulting applicant are provided to employ the computation expression separately.

The downward risk is computed as follows. The computed downward risk is equivalent to the expected maximum loss when a risk model is shifted downward, and serves as the reference data for deciding whether to make a loan. First, the downward shift default probability computation program function 36 computes the default probability when the model is shifted downward (e.g., 95% downward), based on a score value computed by the risk analysis program function 31. The downward risk computation program function 37 computes the maximum loss and the expected pledge value when the model is shifted downward. This is based on the future profit expectancy for both the risk scores computed from the computed average risk score for each applicant and the risk score when shifted downward (95% downward). As a computation method, for example, the downward risk is computed as an average value of the portion below a lower limit value (supposing 1.0%) in an area surrounded by the probability function and the X axis, provided that the future profit expectancy has a normal distribution. In this manner, a downward shift risk for the profit is regarded as the "risk" in this embodiment to compute the expected profit. Also, the risk due to changes in the external environment or bad judgment is incorporated to realize a proper risk return, taking into consideration the degree of risk with the downward risk.

As described above, in this embodiment, information on credit applications and credit applicants are input from the terminal 10 at a remote business office, and received via the network 11 by the credit management server 30. The credit management server 30 derives a surviving probability corresponding to the degree of risk and passage of time based on the attributes and contract history of the applicant in accordance with the information on offers, and outputs a credit decision via the network 11 to the terminal 10.

Then, the credit management server 30 measures the possibility of occurrence of default in payment for each applicant from a viewpoint of "how much" and "how long", and makes use of it for the credit decision. That is, the concept of expected profit is created based on the degree of risk as well as the term structure to realize a decision making and a management on a profit basis to make the credit decision more comprehensive. The final decision whether to grant the loan depends on the magnitude of the expected profit computed by this model. If the final profit is below a threshold, then either the loan is denied or the interest rate is increased. Thus, the decision whether to grant the loan and the parameters for the loan are based not only on present conditions, but future conditions expected during the term of the loan as to probability of default and expected profit.

The invention claimed is:

1. A computer program product comprising program instructions recorded on a computer readable medium, wherein upon execution on a computer, said program instructions decide whether to make a loan to an applicant, said program instructions comprising:
   first program instructions to determine credit risk of said applicant;
   second program instructions to compute a default probability of said applicant over time based on said credit risk;
   third program instructions for computing a sum of expected profit from said loan, said sum of expected profit being equal to interest of said loan minus costs of said loan and minus a loss amount, said loss amount based in part on said default probability;
   fourth program instructions for determining whether said sum of expected profit is at least a minimum profit value; and
   responsive to said fourth program instructions for determining whether said sum of expected profit is at least a minimum profit value, fifth program instructions for making a record that said loan shall be made to said applicant.

2. The computer program product as set forth in claim 1, wherein said first program instructions determine said credit risk based on a credit risk model of said applicant.

3. The computer program product as set forth in claim 2, further comprising sixth program instructions to compute a risk that said risk model will shift downward, said sixth program instructions being recorded on the computer readable media.

4. The computer program product as set forth in claim 1, wherein said second program instructions compute said default probability based in part on a term of said loan.

5. The computer program product as set forth in claim 1, wherein said third program instructions classify said applicant into an initial status class and determine a probability that said applicant will transition from said initial status class into another status class based on said credit risk of said applicant.

6. The computer program product as set forth in claim 5 wherein said third program instructions determine a probability that said applicant will default based in part on said other status class.

7. A computer system for deciding whether to make a loan to an applicant, said system comprising:
   means for determining credit risk of said applicant;
   means for computing a default probability of said applicant over time based on said credit risk; and
   means for computing a sum of expected profit from said loan, wherein said sum of expected profit is equal to interest of said loan minus costs of said loan and minus a loss amount, said loss amount based in part on said default probability;
   means for determining whether said sum of expected profit is at least a minimum profit value; and
   means for making a record that said loan shall be made to said applicant, said means for making a record being responsive to said means for determining whether said sum of expected profit is at least a minimum profit value.

8. A computer program product comprising program instructions recorded on a computer readable medium, wherein upon execution on a computer, said program instructions decide whether to make a loan to an applicant, said program instructions comprising:
   first program instructions to determine a credit risk of said applicant;
   second program instructions to determine a surviving probability of an applicant based on said credit risk of said applicant;
   third program instructions to determine a default probability for each month of a term of said loan based on said surviving probability; and
   fourth program instructions to determine an expected profit during the term of said loan, said sum of expected profit being equal to interest of said loan minus costs of said loan and minus a loss amount, said loss amount based in part on said default probability;
   fifth program instructions for determining whether said sum of expected profit is at least a minimum profit value; and
   responsive to said fifth program instructions for determining whether said sum of expected profit is at least a minimum profit value, sixth program instructions for making a record that said loan shall be made to said applicant.

9. The computer program product as set forth in claim 8, further comprising seventh program instructions to classify said applicant into an initial status class and determine a probability that said applicant will transition from said initial status class to another status class based on said credit risk of said applicant,
   said seventh program instructions being recorded on the computer readable media.

10. The computer program product as set forth in claim 9 wherein said seventh program instructions determine a probability that said applicant will default based in part on said other status class.

11. A computer program product comprising program instructions recorded on a computer readable medium, wherein upon execution on a computer, said program instructions for deciding whether to make a loan to an applicant, said program instructions comprising:
   first program instructions to determine a risk model for said applicant based on attributes of said applicant;
   second program instructions to determine a default probability of said applicant as a function of time based on said risk model;
   third program instructions to compute a sum of an expected profit from said loan over time, said sum of expected profit being equal to interest of said loan minus costs of said loan and minus a loss amount, said loss amount based in part on said default probability;

fourth program instructions for determining whether said sum of expected profit is greater than or equal to a minimum profit value; and responsive to said fourth program instructions for determining whether said sum of expected profit is at least a minimum profit value, fifth program instructions for making a record that said loan shall be made to said applicant.

12. The computer program product as set forth in claim 11, wherein said first program instructions determine said risk model by a logistic regression analysis.

13. The computer program product as set forth in claim 12 wherein said logistic regression analysis evaluates a quantitative variable for said applicant derived from a tree analysis which classifies said applicant into a risk status class.

14. The computer program product as set forth in claim 11, wherein said second program instructions determine said default probability for each month, wherein said default probability is different for different months.

* * * * *